(12) United States Patent
Wichgers

(10) Patent No.: US 12,498,447 B1
(45) Date of Patent: Dec. 16, 2025

(54) ANGULAR VELOCITY VECTOR-BASED POSITIONING SYSTEM AND METHOD

(71) Applicant: Rockwell Collins, Inc., Cedar Rapids, IA (US)

(72) Inventor: Joel M. Wichgers, Urbana, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 284 days.

(21) Appl. No.: 18/388,681

(22) Filed: Nov. 10, 2023

(51) Int. Cl.
*G01S 5/02* (2010.01)
*H04W 64/00* (2009.01)

(52) U.S. Cl.
CPC .......... *G01S 5/0294* (2013.01); *G01S 5/0264* (2020.05); *G01S 2205/03* (2020.05); *G01S 2205/07* (2020.05); *H04W 64/00* (2013.01)

(58) Field of Classification Search
CPC .. G01S 5/0294; G01S 5/0264; G01S 2205/07; G01S 2205/03; H04W 64/00
USPC ............... 342/195, 357.42, 357.62, 372, 451
See application file for complete search history.

(56) References Cited

U.S. PATENT DOCUMENTS

| | | | |
|---|---|---|---|
| 3,796,989 A | 3/1974 | Johnston et al. | |
| 8,599,956 B1 | 12/2013 | Mitchell | |
| 9,883,348 B1 | 1/2018 | Walker et al. | |
| 10,194,269 B2 | 1/2019 | Venkataraman et al. | |
| 10,281,560 B2 | 5/2019 | Xue et al. | |
| 10,568,064 B2 | 2/2020 | Seth et al. | |
| 10,948,566 B1 | 3/2021 | Harbin et al. | |
| 11,280,874 B2 | 3/2022 | Fortney | |
| 11,280,896 B2 | 3/2022 | Hawker et al. | |
| 11,412,347 B2 | 8/2022 | Demirdag et al. | |
| 11,665,658 B1 | 5/2023 | Sorsby et al. | |
| 2012/0086596 A1* | 4/2012 | Insanic | G01S 7/003 342/26 D |
| 2016/0118716 A1* | 4/2016 | Stephenne | H01Q 3/34 342/372 |
| 2021/0088622 A1 | 3/2021 | Nishimoto | |
| 2021/0255333 A1 | 8/2021 | Sornin et al. | |
| 2022/0365165 A1 | 11/2022 | Kirchner et al. | |
| 2023/0009717 A1 | 1/2023 | Bilstad et al. | |
| 2023/0118390 A1* | 4/2023 | Ninos | G01S 13/42 342/59 |
| 2023/0229175 A1 | 7/2023 | Squillace et al. | |

FOREIGN PATENT DOCUMENTS

| | | |
|---|---|---|
| EP | 2988146 A1 | 2/2016 |
| EP | 3273271 B1 | 6/2023 |
| GB | 2542491 A | 3/2017 |
| WO | 2022106139 A3 | 5/2022 |
| WO | 2022155436 A1 | 7/2022 |
| WO | 2022221429 A1 | 10/2022 |
| WO | 2022226233 A1 | 10/2022 |
| WO | 2023096950 A1 | 6/2023 |

* cited by examiner

*Primary Examiner* — Bo Fan
(74) *Attorney, Agent, or Firm* — Suiter Swantz IP

(57) ABSTRACT

A system includes a node configured to: receive at least one signal from another node; determine an angular velocity vector between the node and the other node; determine a velocity vector of the node; determine a velocity vector of the other node; determine a relative velocity vector between the node and the other node; and determine a relative range vector between the node and the other node, the relative range vector indicating a relative position between the node and the other node.

20 Claims, 10 Drawing Sheets

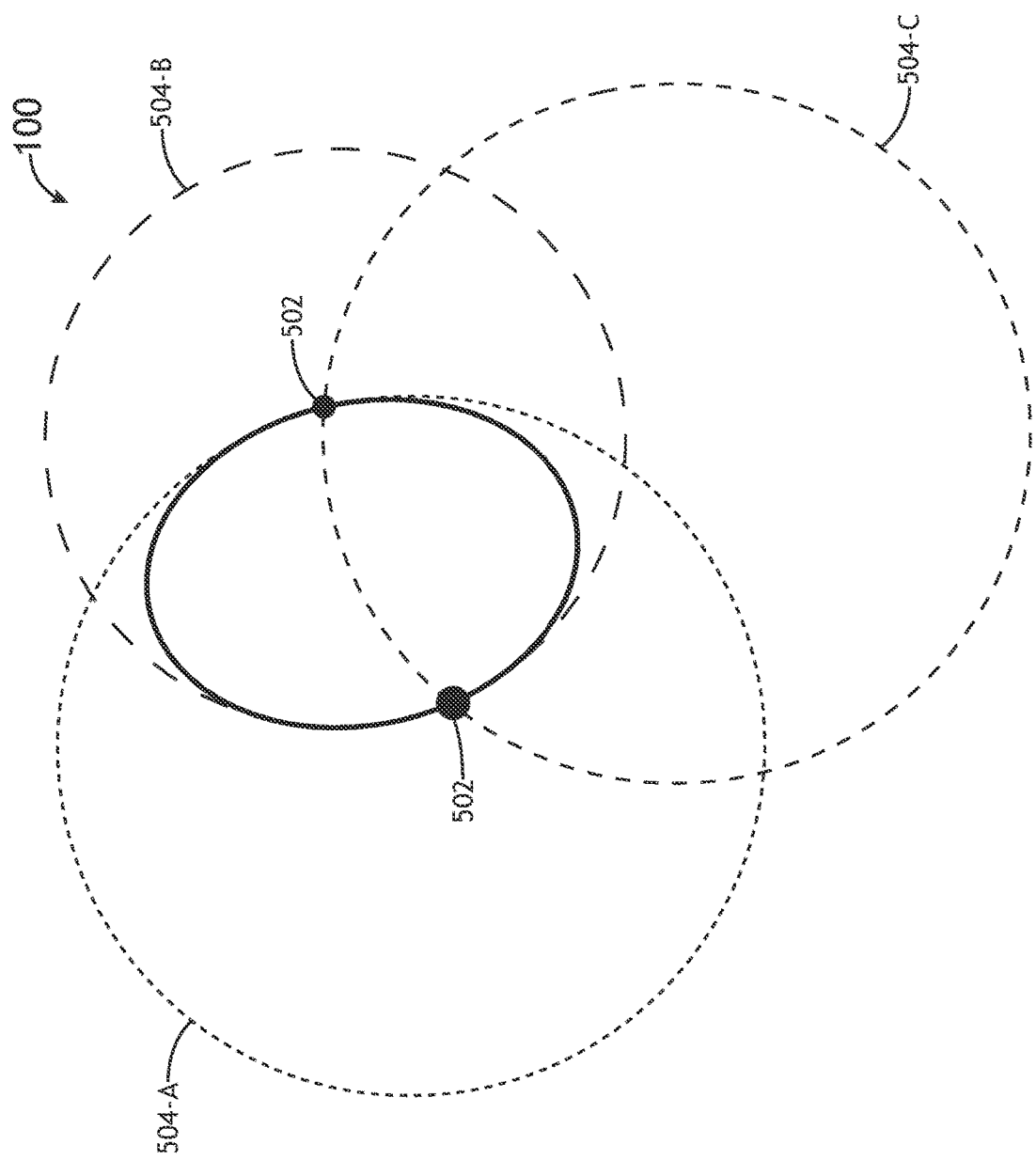

712 — BASED AT LEAST ON THE ANGULAR VELOCITY VECTOR AND THE RELATIVE VELOCITY VECTOR BETWEEN THE NODE AND THE OTHER NODE, DETERMINING, BY THE NODE, A RELATIVE RANGE VECTOR BETWEEN THE NODE AND THE OTHER NODE, THE RELATIVE RANGE VECTOR INDICATING A RELATIVE POSITION BETWEEN THE NODE AND THE OTHER NODE

714 — BASED AT LEAST ON THE RELATIVE RANGE VECTOR, AT LEAST ONE OF (A) OUTPUTTING, BY THE NODE, INSTRUCTIONS TO ADJUST COMMUNICATION PARAMETERS, (B) OUTPUTTING, BY THE NODE, INSTRUCTIONS TO ADJUST OPERATIONAL PARAMETERS OF AT LEAST ONE OF AT LEAST ONE SUB-SYSTEM OR AT LEAST ONE SENSOR OF THE NODE, (C) OUTPUTTING, BY THE NODE, INSTRUCTIONS TO DISPLAY AT LEAST ONE GRAPHICAL IMAGE INCLUDING INFORMATION OF THE AT LEAST ONE OF THE POSITION INFORMATION OF THE NODE OR THE TIME INFORMATION OF THE NODE, (D) OUTPUTTING, BY THE NODE, INSTRUCTIONS TO NAVIGATE THE NODE, (E) OUTPUTTING, BY THE NODE, INSTRUCTIONS TO COMMUNICATE WITH AT LEAST ONE NODE, (F) AUTHENTICATING, BY THE NODE, POSITION INFORMATION OBTAINED FROM AT LEAST ONE NAVIGATION SYSTEM, (G) AUTHENTICATING, BY THE NODE, TIME INFORMATION OBTAINED FROM AT LEAST ONE TIME SYSTEM, OR (H) OUTPUTTING, BY THE NODE, INSTRUCTIONS TO THE AT LEAST ONE NODE TO SUPPORT CONTROLLING COMMUNICATIONS WITH THE NODE THROUGH THE AT LEAST ONE NODE

FIG.7 Cont.

ANGULAR VELOCITY VECTOR-BASED POSITIONING SYSTEM AND METHOD

BACKGROUND

Determining, maintaining, and/or assuring the absolute and/or relative position information and/or time information of various nodes in commercial and military environments is important; for example, determining, maintaining, and/or assuring the absolute and/or relative position information and/or time information of various nodes in a connected battlespace may be important to mission success. For example, determining, maintaining, and/or assuring the absolute and/or relative position information and/or time information of various nodes may enable directional communications, networking, navigation, surveillance, safe separation, collision avoidance, mission collaboration, etc.

Currently, using navigation systems (e.g., global navigation satellite systems (GNSS), like global positioning systems (GPS)) and datalinks to determine the absolute and/or relative position information and/or time information of various nodes and exchanging the information works in permissive environments; however, in contested battlespace environments, navigation systems (e.g., GPS) and communications among various nodes may often be challenged, making such solutions unreliable and not assured.

Currently, two-way timing and ranging (TWTR) involves transmitting interrogation and reply signals between two or more nodes to enable the determination of relative and/or absolute position information and/or the transfer of time information. TWTR involves an ownship node transmitting TWTR interrogation message as an interrogation signal(s), which is received by one or more additional nodes, and those additional nodes send a TWTR response message as a reply signal(s) to the ownship node's interrogation signal(s).

Currently, the ownship node can determine two-way range by measuring a delta time between a transmission of the interrogation signal and the receipt of the reply signal, by knowing the time delay that each reply node used between receipt of the interrogation signal and the transmission of the reply node's reply signal. Also, as part of the reply signal, if timing information is communicated from the node replying, then the ownship node can determine the time as known by the reply node.

Currently, TWTR may be suitable in some situations to be able to determine time information, determine relative position information, and even determine absolute position information if the position of the reply node is known and either the direction to the reply node is known or there are multiple reply nodes that have communicated their positions. The communication of position by the reply node can be done explicitly as part of the reply signal, or the position of the reply node may be known by the ownship node (e.g., reply node is at fixed position known to the ownship node), or the position of the reply node can be determined or estimated by the ownship node (e.g., reply node position can be predicted using equations of motion model).

Currently, TWTR can be used to determine precise relative position information, absolute position information, and/or time information of an ownship node, which can be useful in contested environments, whereby, for instance, a global navigation satellite system (GNSS) (e.g., global positioning system (GPS)) or other navigation systems may be denied (e.g., jammed) or may be spoofed.

TWTR transmissions (e.g., both interrogations and replies) can use, for example, signals that have significantly higher power than other navigation signals (like GPS), directional communications, spread spectrum, frequency hopping, etc. and other techniques for robust and efficient communications as well as for positioning and/or time transfer between nodes.

Currently, one problem with TWTR is that it requires radiofrequency (RF) emissions from an ownship node to achieve TWTR benefits (e.g., alternative source of position, navigation, and timing (PNT)). Emitting RF energy (e.g., via interrogation and/or reply signals) to determine and maintain position can be undesirable in contested environments, where hostile forces can more easily detect, identify, locate, and/or target the ownship node. For example, in highly contested environments, the military often wants nodes to operate with Emission Control (EMCON) (e.g., radio silence or very limited emissions). Furthermore, emitting TWTR signals (e.g., interrogations and replies) even in permissive environments (e.g., where GPS is received but TWTR is used for assurance) can lead to unnecessary RF congestion, especially as the number of nodes increases.

SUMMARY

In one aspect, embodiments of the inventive concepts disclosed herein are directed to a system. The system may include a node including at least one radio and at least one processor. The node may be configured to: receive at least one signal from another node, wherein the node and the other node are in relative motion; based at least on the at least one signal from the other node, determine an angular velocity vector between the node and the other node; determine a velocity vector of the node; determine a velocity vector of the other node; based at least on the velocity vector of the node and the velocity vector of the other node, determine a relative velocity vector between the node and the other node; based at least on the angular velocity vector and the relative velocity vector between the node and the other node, determine a relative range vector between the node and the other node, the relative range vector indicating a relative position between the node and the other node; and based at least on the relative range vector, at least one of (a) output instructions to adjust communication parameters, (b) output instructions to adjust operational parameters of at least one of at least one sub-system or at least one sensor of the node, (c) output instructions to display at least one graphical image including information of the at least one of the position information of the node or the time information of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

In a further aspect, embodiments of the inventive concepts disclosed herein are directed to a method. The method may include: receiving, by a node, at least one signal from another node, wherein the node and the other node are in relative motion, wherein the node comprises at least one radio and at least one processor; based at least on the at least one signal from the other node, determining, by the node, an angular velocity vector between the node and the other node; determining, by the node, a velocity vector of the node; determining, by the node, a velocity vector of the other node; based at least on the velocity vector of the node and the velocity vector of the other node, determining, by the node, a relative velocity vector between the node and the other node; based at least on the angular velocity vector and the relative velocity vector between the node and the other node, determining, by the node, a relative range vector between the node and the other node, the relative range vector indicating a relative position between the node and the other node; and based at least on the relative range vector, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 is a view of an exemplary embodiment of the system of FIG. 1 according to the inventive concepts disclosed herein.

DETAILED DESCRIPTION

Figure 1:
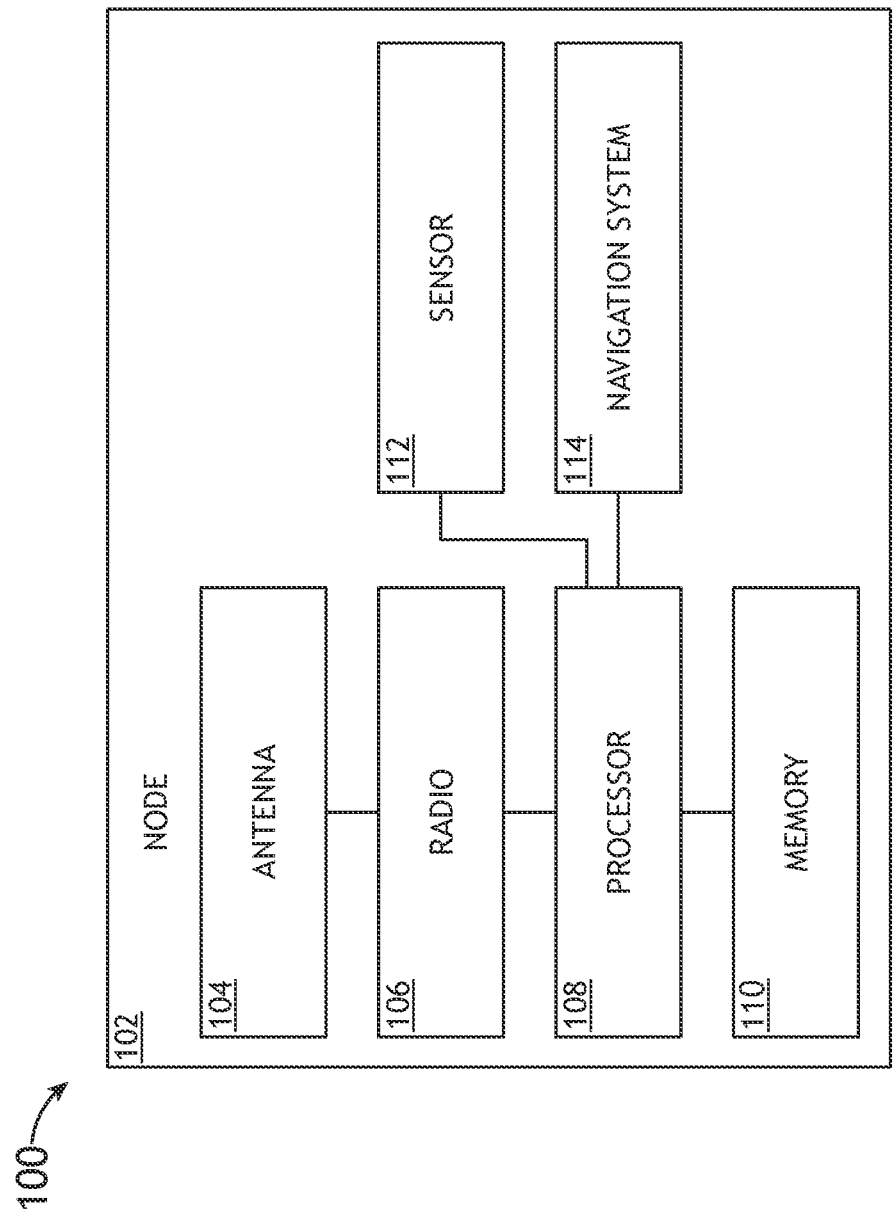
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and they should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a node configured to determine a relative range vector between the node and another node (e.g., based at least on an angular velocity vector and a relative velocity vector between the node and the other node).

Some embodiments can be used to determine angular velocity vector, $\vec{\omega}$, (i.e., the rate of change of line of sight (LOS) between an ownship node (O) and an other node (A)) from at least one (e.g., multiple) "snapshot" angular measurement(s). Based at least on the angular velocity vector, a relative range vector, $\vec{R}$, can be determined. For example, Tx and Rx nodes that have inertial systems (or other systems to determine velocity), the relative velocity vector, $\vec{V}$, between the ownship node (Node O) and the other node (Node A) can be known. For example, the relative velocity vector can be determined, by knowing both the ownship node (Node O) velocity vector and the other node (Node A) velocity vector. However, if the other node (Node A) velocity vector is not known, the sensitivity to the other node (Node A) velocity vector being unknown or having large estimation errors may be reduced when the ownship node (Node O) increases its velocity perpendicular to the LOS between the ownship node (Node O) and the other node (A) to mitigate a range estimation error.

In some embodiments, the relative range vector can be insensitive to an angular bias error, for example, if the angular velocity vector @ can be estimated with small enough error (e.g., based upon successive angular measurements with known delta time or times between measurements).

The angular velocity formula is $$\vec{V} = \vec{\omega} \times \vec{R}.$$

$\vec{V}$ is the relative velocity vector, $\vec{\omega}$ is the angular velocity vector (i.e., rate of change of LOS angle vector), and $\vec{R}$ is the relative range vector, and "x" represents the cross product of the two vectors. In some embodiments, by knowing $\vec{V}$ (e.g., from at least one navigation system, like inertial systems) and $\vec{\omega}$, a node can readily compute a relative range vector $\vec{R}$.

Embodiments have advantages over existing PNT methods. Some embodiments may be insensitive to relative angular measurement and/or time differences between the ownship node (Node O) and the other node (Node A). Some embodiments do not need TWTR messages communicated between the ownship node (Node O) and the other node (Node A). For example, currently, TWTR includes additional functionality, explicit data transfer, and overhead to establish accurate relative time and relative line-of-sight (LOS) distance between ownship and two or more nodes to determine the unbiased direction, and hence relative range vector.

Some embodiments may leverage known velocity information of the nodes to determine the relative velocity vector ($\vec{V}$) (e.g., from inertial navigation systems) to compute the relative range vector ($\vec{R}$) from the measured LOS rates of change vector ($\vec{\omega}$), to enable computing relative range vector using the angular velocity formula:

$$\vec{V} = \vec{\omega} \times \vec{R}.$$

Some embodiments may achieve the benefits of TWTR to determine and/or maintain precise position and time, such as for nodes in contested environments, without an RF emission from an ownship node.

Some embodiments may provide a highly advantageous use-case for contested environments, whereby nodes can determine and maintain precise position and time transfer and/or time synchronization without emitting RF energy (e.g., via TWTR). For example, some embodiments may be highly advantageous for nodes in a contested environment under Emission Control (EMCON), which is a military state of minimal radio emissions.

Some embodiments may enable military concepts of operations to maintain precise position and time. For example, high value nodes in a contested environment may be configured to remain silent without emitting RF energy while gaining the benefit of determining a position and time of their ownship high value node; RF emissions can be limited to nodes in more permissive environments and/or attritable nodes (e.g., relatively lower value nodes compared to the high value nodes) in the contested environment so as to mitigate risk to high value nodes associated with RF emissions. Another possible military concept of operation is where "fragile" nodes, which are more vulnerable to an adversary, may be configured to remain silent without emitting RF energy while gaining the benefit of determining ownship node position information and/or time information, while "protected" nodes, which are less susceptible to being disabled or destroyed by the adversary (e.g., due to location outside the contested zone in a more permissive environment, or within the contested zone but fortified with armor or other means of robustness), may be configured for active RF emissions.

In some embodiments, an ownship node may be configured to determine an ownship node position and time by listening (e.g., passively listening) to other nodes emitting RF emissions. For example, passively listening may allow the ownship node to avoid transmitting RF emissions (e.g., which may be important for military aircraft in contested environments, where EMCON is often used to avoid detection and targeting; and/or e.g., which may reduce RF congestion in commercial and/or military networks), while still being able to determine position and time (e.g., which may be especially important if GNSS (e.g., GPS) positioning is jammed or otherwise unavailable).

In some embodiments, emission-less position and time determination can be used to authenticate GNSS (or other navigation systems) position and/or time determination (e.g., for spoofing detection and mitigation). In some embodiments, emission-less position and time determination can be used to maintain time and position of nodes across a network (e.g., a commercial and/or military network), which may be important for networked communications (e.g., directional, time slotted, authenticated communications, etc.). In some embodiments, emission-less position and time determination can significantly reduce the number of actively-emitting RF nodes necessary to maintain network time and positions, which may be very important to mitigate the amount of RF bandwidth and/or spectrum resources, power associated with emissions, equipment reliability (e.g., fewer emissions), etc.

As used herein, the term "position information" may refer to information associated with position (which may be in any of various formats, like absolute position relative to an established reference system (e.g., World Geodetic Survey 1984 (WGS-84)), and/or relative position between nodes), and "position information" may include information of one or more other absolute or relative position states of the node, such as velocity, acceleration, and/or jerk.

As used herein, the term "time information" may refer to information associated with time (which may be in any of various formats, like absolute time relative to an established reference system (e.g., Universal Time Coordinated (UTC)), and/or relative time between nodes), and "time information" may include information of one or more other absolute or relative time states of the node, such as time bias, time drift rate, and/or rate of change of time drift rate.

Referring now to FIGS. 1-5, an exemplary embodiment of a system 100 according to the inventive concepts disclosed herein is depicted. The system 100 may be implemented as any suitable system, such as a network (e.g., an RF-based network, a wireless network, a mobile ad hoc network (MANET), a mobile network (e.g., a 4G or a 5G network), or sonar network). The system 100 may include a plurality of nodes 102 (e.g., node 102-O (which may refer to an ownship node), node 102-A, and/or node 102-B), some or all of which may be communicatively coupled at any given time.

Each node 102 (e.g., 102-O (which may refer to an ownship node), 102-A, or 102-B) may be any suitable node, such as a vehicle (e.g., an aircraft (e.g., a manned aircraft or a UAV (e.g., an attritable UAV)), a watercraft, a submersible craft, an automobile, a spacecraft, a satellite, and/or a train), a manpack, a projectile, a mobile device (e.g., a mobile phone and/or a laptop computing device), a building, a structure, a sensor, or a platform (e.g., a radio tower). As shown in FIG. 1, each node 102 may include at least one antenna 104, at least one radio 106 (e.g., at least one software-defined radio (SDR)), at least one processor 108, at least one memory 110, at least one sensor 112 (e.g., at least one electro-optical/infrared (EO/IR) sensor, at least one radar sensor, and/or at least one LIDAR sensor), and/or at least one navigation system 114 (e.g., at least one GNSS device (e.g., at least one GPS device), at least one altimeter, at least one radar, at least one lidar, at least one electro-optical/infrared (EO/IR) sensor, at least one magnetic anomaly, at least one terrain database, at least one distance measuring equipment (DME), at least one tactical air navigation system (TACAN), at least one long-range navigation (LORAN) system, and/or at least one inertial navigation system (e.g., at least one Ring Laser Gyro, at least one Inertial Measurement Unit (IMU), at least one Fiber Optic Gyro (FOG), and/or at least one Micro-Electromechanical System (MEMS)), some or all of which may be communicatively coupled at any given time. For example, each radio 106 may be configured to communicate via any suitable waveform(s). In some embodiments, the radio 106 includes one or more of the antennas 104. For example, the at least one antenna 104, the at least one radio 106, the at least one processor 108, the at least one memory 110, the at least one sensor 112, and/or the at least one navigation system 114 may be configured to perform (e.g., collectively perform if more than one radio, more than one antenna, more than one radio, more than one processor, more than one memory, more than one sensor, and/or more than one navigation system) any or all of the operations disclosed throughout. For example, the at least one processor 108 may be configured to perform (e.g., collectively perform if more than one processor) any or all of the operations disclosed throughout. The at least one processor 108 may be configured to run various software applications or computer code stored (e.g., maintained) in a non-transitory computer-readable medium (e.g., memory 110) and configured to execute various instructions or operations. For example, the at least one processor 108 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 108 may include a CPU and/or an FPGA configured to perform (e.g., collectively perform) any of the operations disclosed throughout.

In some embodiments, the node 102 (e.g., 102-O) may be configured to: receive at least one signal (e.g., at least one emitted signal and/or at least one reflected signal, wherein the at least one signal may be at least one of at least one electromagnetic signal (e.g., at least one RF signal, at least one optical signal (e.g., at least one visible spectrum signal and/or at least one invisible spectrum signal (e.g., at least one infrared (IR) signal and/or at least one ultraviolet (UV) signal); e.g., at least one laser signal) and/or at least one pressure wave signal (e.g., at least one sound signal) such that the at least one signal is emitted from and/or reflected off of another node 102 (e.g., 102-A or 102-B) at least in part toward the node 102 (e.g., 102-O; e.g., at least one radio, at least one antenna, at least one EO/IR sensor, at least one radar sensor, and/or at least one LIDAR sensor of the node 102-O) from another node 102 (e.g., 102-A or 102-B), wherein the node 102 (e.g., 102-O (Node O)) and the other node 102 (e.g., 102-A (Node A) or 102-B (Node B)) are in relative motion; based at least on the at least one signal from the other node 102 (e.g., 102-A or 102-B), determine an angular velocity vector between the node 102 (e.g., 102-O) and the other node 102 (e.g., 102-A or 102-B); determine a velocity vector of the node 102 (e.g., 102-O); determine a velocity vector of the other node 102 (e.g., 102-A or 102-B); based at least on the velocity vector of the node 102 (e.g., 102-O) and the velocity vector of the other node 102 (e.g., 102-A or 102-B), determine a relative velocity vector between the node 102 (e.g., 102-O) and the other node 102 (e.g., 102-A or 102-B); based at least on the angular velocity vector and the relative velocity vector between the node 102 (e.g., 102-O) and the other node 102 (e.g., 102-A or 102-B), determine a relative range vector between the node 102 (e.g., 102-O) and the other node 102 (e.g., 102-A or 102-B), the relative range vector indicating a relative position between the node 102 (e.g., 102-O) and the other node 102 (e.g., 102-A or 102-B); and/or based at least on the relative range vector, at least one of (a) output instructions to adjust communication parameters (e.g., adjust a power gain, steer an electronically scanned array (ESA, such as an active ESA (AESA)) or a directional antenna, and/or adjust frequency), (b) output instructions to adjust operational parameters of at least one of at least one sub-system (e.g., a radar system (e.g., a weather radar system)) or at least one sensor of the node 102 (e.g., 102-O), (c) output instructions to display at least one graphical image including information of the at least one of the position information of the node 102 (e.g., 102-O) or the time information of the node 102 (e.g., 102-O), (d) output instructions to navigate the node 102 (e.g., 102-O), (e) output instructions to communicate with at least one node (e.g., 102-A, 102-B, and/or at least one other node), (f) authenticate position information obtained from a global navigation satellite system (GNSS) device, (g) authenticate time information obtained from a time system (e.g., a GNSS device), (h) output instructions to the at least one node (e.g., 102-A, 102-B to support controlling communications with the node 102 (e.g., 102-O) through the at least one node (e.g., 102-A, 102-B, 102-C, and/or at least one other node), (i) utilize the position information of the node 102 to compute other information, or (j) utilize the time information of the node 102 to compute additional information.

In some embodiments, the node 102 (e.g., 102-O) does not transmit any radiofrequency (RF) signal during a time interval spanning performance of: the receipt of the at least one signal from the other node 102 (e.g., 102-A or 102-B); the determination of the angular velocity vector between the node 102 (e.g., 102-O) and the other node 102 (e.g., 102-A or 102-B); the determination of the velocity vector of the node 102 (e.g., 102-O); the determination of the velocity vector of the other node 102 (e.g., 102-A or 102-B); the determination of the relative velocity vector between the node 102 (e.g., 102-O) and the other node 102 (e.g., 102-A or 102-B); and the determination of the range vector between the node 102 (e.g., 102-O) and the other node 102 (e.g., 102-A or 102-B).

In some embodiments, the node 102 (e.g., 102-O) does not transmit any two-way timing and ranging (TWTR) interrogation message or TWTR response message during a time interval spanning performance of: the receipt of the at least one signal from the other node 102 (e.g., 102-A or 102-B); the determination of the angular velocity vector between the node 102 (e.g., 102-O) and the other node 102 (e.g., 102-A or 102-B); the determination of the velocity vector of the node 102 (e.g., 102-O); the determination of the velocity vector of the other node 102 (e.g., 102-A or 102-B); the determination of the relative velocity vector between the node 102 (e.g., 102-O) and the other node 102 (e.g., 102-A or 102-B); and the determination of the range vector between the node 102 (e.g., 102-O) and the other node 102 (e.g., 102-A or 102-B).

In some embodiments, the node 102 (e.g., 102-O) may be configured to: based at least on the range vector and one of (a) an absolute position of the node 102 (e.g., 102-O) or (b) an absolute position of the other node 102 (e.g., 102-A or 102-B), determine an absolute position of the node 102 (e.g., 102-O) or the other node 102 (e.g., 102-A or 102-B).

In some embodiments, the at least one signal are multiple signals, the node 102 (e.g., 102-O) may be configured to: based at least on the multiple signals from the other node 102 (e.g., 102-A or 102-B), determine multiple angular velocity vectors to determine the angular velocity vector between the node 102 (e.g., 102-O) and the other node 102 (e.g., 102-A or 102-B), wherein the angular velocity vector is a weighted angular velocity vector; and/or based at least on the weighted angular velocity vector and the relative velocity vector between the node 102 (e.g., 102-O) and the other node 102 (e.g., 102-A or 102-B), determine the relative range vector between the node 102 (e.g., 102-O) and the other node 102 (e.g., 102-A or 102-B). In some embodiments, the weighted angular velocity vector is average weighted or recency weighted.

In some embodiments, the node 102 (e.g., 102-O) may be configured to: receive at least one signal from an additional node 102 (e.g., 102-A or 102-B), wherein the node 102 (e.g., 102-O) and the additional node 102 (e.g., 102-A or 102-B) are in relative motion; based at least on the at least one signal from the additional node 102 (e.g., 102-A or 102-B), determine an additional angular velocity vector between the node 102 (e.g., 102-O) and the additional node 102 (e.g., 102-A or 102-B); determine an additional velocity vector of the node 102 (e.g., 102-O); determine an additional velocity vector of the additional node 102 (e.g., 102-A or 102-B); based at least on the additional velocity vector of the node 102 (e.g., 102-O) and the additional velocity vector of the additional node 102 (e.g., 102-A or 102-B), determine an additional relative velocity vector between the node 102 (e.g., 102-O) and the additional node 102 (e.g., 102-A or 102-B); based at least on the additional angular velocity vector and the additional relative velocity vector between the node 102 (e.g., 102-O) and the additional node 102 (e.g., 102-A or 102-B), determine an additional relative range vector between the node 102 (e.g., 102-O) and the additional node 102 (e.g., 102-A or 102-B), the additional relative range vector indicating a relative position between the node 102 (e.g., 102-O) and the additional node 102 (e.g., 102-A or 102-B); and/or based at least on the additional relative range vector, at least one of (a) output additional instructions to adjust the communication parameters (e.g., adjust a power gain, steer an electronically scanned array (ESA, such as an active ESA (AESA)) or a directional antenna, and/or adjust frequency), (b) output additional instructions to adjust the operational parameters of at least one of the at least one sub-system (e.g., a radar system (e.g., a weather radar system)) or at least one sensor of the node 102 (e.g., 102-O), (c) output additional instructions to display the at least one graphical image including information of the at least one of the position information of the node 102 (e.g., 102-O) or the time information of the node 102 (e.g., 102-O), (d) output additional instructions to navigate the node 102 (e.g., 102-O), (e) output additional instructions to communicate with the at least one node (e.g., 102-A, 102-B, and/or at least one other node), (f) authenticate the position information obtained from the global navigation satellite system (GNSS) device, (g) authenticate the time information obtained from the time system (e.g., a GNSS device), (h) output additional instructions to the at least one node (e.g., 102-A, 102-B to support controlling communications with the node 102 (e.g., 102-O) through the at least one node (e.g., 102-A, 102-B, 102-C, and/or at least one other node), (i) utilize the position information of the node 102 to compute additional other information, or (j) utilize the time information of the node 102 to compute further additional information.

In some embodiments, the node 102 (e.g., 102-O) knows the absolute position of one of the node 102 (e.g., 102-O) or the other node 102 (e.g., 102-A or 102-B), wherein the node 102 (e.g., 102-O) may be further configured to determine the absolute position of the node 102 (e.g., 102-O) or the other node 102 (e.g., 102-A or 102-B) based at least on the absolute position of the one of the node 102 (e.g., 102-O) or the other node 102 (e.g., 102-A or 102-B) and the relative range vector.

In some embodiments, the at least one signal are multiple signals, and the node 102 (e.g., 102-O) may be configured to iteratively: receive each of the multiple signals from the other node 102 (e.g., 102-A or 102-B), wherein the node 102 (e.g., 102-O) and the other node 102 (e.g., 102-A or 102-B) are in relative motion; based at least on at least some of the multiple signals from the other node 102 (e.g., 102-A or 102-B), determine the angular velocity vector between the node 102 (e.g., 102-O) and the other node 102 (e.g., 102-A or 102-B); determine the velocity vector of the node 102 (e.g., 102-O); determine the velocity vector of the other node 102 (e.g., 102-A or 102-B); based at least on the velocity vector of the node 102 (e.g., 102-O) and the velocity vector of the other node 102 (e.g., 102-A or 102-B), determine the relative velocity vector between the node 102 (e.g., 102-O) and the other node 102 (e.g., 102-A or 102-B); and/or based at least on the angular velocity vector and the relative velocity vector between the node 102 (e.g., 102-O) and the other node 102 (e.g., 102-A or 102-B), determine the relative range vector between the node 102 (e.g., 102-O) and the other node 102 (e.g., 102-A or 102-B). In some embodiments, the node 102 (e.g., 102-O) may be further configured to iteratively: use a position filter (e.g., at least one Kalman filter, at least one extended Kalman filter, and/or at least on least squares filter) to optimize determining the relative range vector between the node 102 (e.g., 102-O) and the other node 102 (e.g., 102-A or 102-B).

In some embodiments, the at least one signal is at least one radiofrequency (RF) signal.

In some embodiments, the node 102 (e.g., 102-O) further includes at least one sensor 112 (e.g., at least one electro-optical/infrared (EO/IR) sensor, at least one radar sensor, and/or at least one LIDAR sensor). In some embodiments, the node 102 (e.g., 102-O) further includes at least one of at least one navigation system 114 (e.g., at least one GNSS device (e.g., at least one GPS device), at least one altimeter, at least one radar, at least one lidar, at least one electro-optical/infrared (EO/IR) sensor, at least one magnetic anomaly, at least one terrain database, at least one distance measuring equipment (DME), at least one tactical air navigation system (TACAN), at least one long-range navigation (LORAN) system, and/or at least one inertial navigation system (e.g., at least one Ring Laser Gyro, at least one Inertial Measurement Unit (IMU), at least one Fiber Optic Gyro (FOG), and/or at least one Micro-Electromechanical System (MEMS)). In some embodiments, the node 102 (e.g., 102-O) further includes at least one of at least one antenna 104. In some embodiments, the node 102 (e.g., 102-O) may be further configured to: based at least on the at least one signal from the other node 102 (e.g., 102-A or 102-B) and information received from at least one of the at least one radio 106 or the at least one sensor 112, determine the angular velocity vector between the node 102 (e.g., 102-O) and the other node 102 (e.g., 102-A or 102-B); determine the velocity vector of the node 102 (e.g., 102-O) based at least on information received from the at least one navigation system 114; and/or determine the velocity vector of the other node 102 (e.g., 102-A or 102-B) based at least on information received from the at least one sensor 112.

Figure 2:
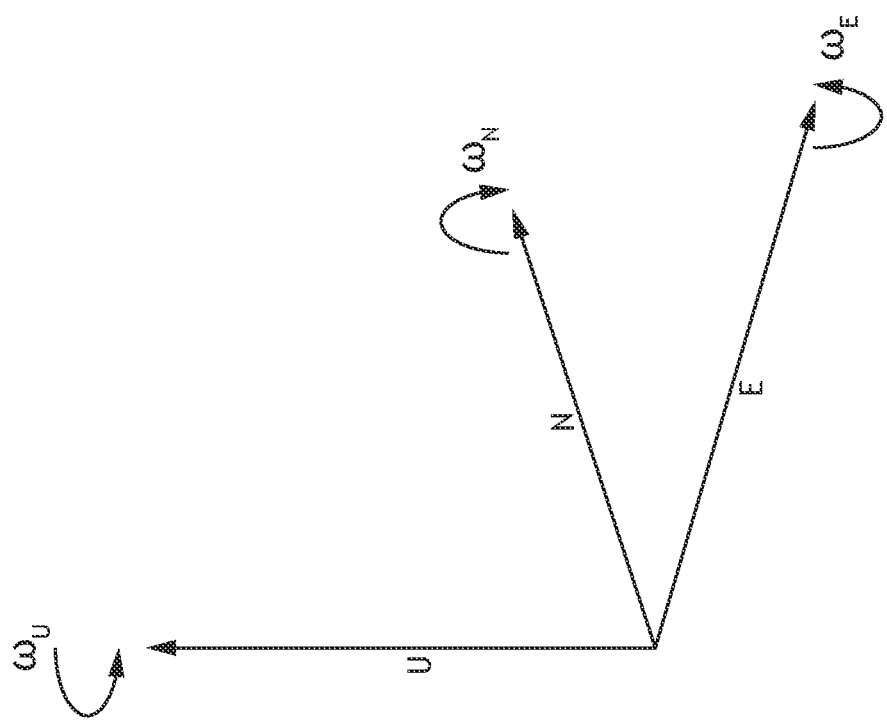
FIG. 2 is an illustration of a standard right-handed, orthogonal coordinate reference frame according to the inventive concepts disclosed herein.

Referring now to FIG. 2, exemplary embodiments of the system 100 of FIG. 1 may use a standard right-handed, orthogonal coordinate reference frame to define LOS angles, angle rates, etc., according to the inventive concepts disclosed herein. As shown in FIG. 2, such a coordinate system (or equivalent) may be used consistently for the computations identified herein. The exemplary coordinate system shown in FIG. 2 and as used herein is East, North, Up (ENU) where "E" represents East, "N" represents North, and "U" represents Up. Vectors E, N, and U represent unit vectors in the direction of positive East, North, and Up axes, respectively. While this description herein uses a standard ENU coordinate system, other coordinate systems may also be used, such as North, East, Down (NED).

FIG. 2 shows the standard, right-handed, orthogonal, E, N, U coordinate frame. Angle rates relative to the LOS between node 102 (e.g., 102-O) (which may also be referred to herein as "Node O") and other nodes 102 (e.g., 102-A and/or 102-B) (which may also be referred to herein as "Node A", "Node B", etc.) may be measured as rotations of the LOS vector from Node O 102-O to the other nodes 102-A and/or 102-B as rotations about the E, N, and U axes. For the purposes of the examples provided herein, the origin of the coordinate system is centered on Node O (e.g., 102-O).

For example, the LOS relative range vector between the own Node O 102-O and another Node A 102-A is given by the symbol $\vec{R}$ or $\vec{R}_{O2A}$, and the latter explicitly identifies the nodes that the range vector is between. If there is relative velocity between the Own Node O 102-O and another Node A, the LOS relative range vector will change over time. For example, the angular velocity vector (also known as the angle rate vector) of the LOS vector between the own Node O 102-O and another Node A 102-A is known as the angle rate vector ($\vec{\omega}$), which can be measured about the E, N, and U axes as ($\omega_E$, $\omega_N$, $\omega_U$). The positive sense for the angle rates in the examples follows the right-hand rule (i.e., with your right hand, put your thumb in the direction of the positive axis, and the direction that your fingers on your right-hand curl is the positive direction of angle rate rotation about the axis), as shown in FIG. 2.

Referring generally to FIGS. 3A, 3B, 4A, and 4B, exemplary embodiments of the system 100 of FIG. 1, according to the inventive concepts disclosed herein, are depicted. As shown in FIGS. 3A, 3B, 4A, and 4B, the system 100 may include node 102-O (which may also be referred to herein as "Node O") at least one other node (e.g., 102-A, and/or 102-B) (which may also be referred to herein as "Node A", "Node B", "Node C", "Node D", etc.).

In some embodiments, the Node O 102-O may be configured to determine own Node O position with angular rate measurements of the rate of change of the LOS to another Node A 102-A.

The Node O 102-O may be configured to determine and/or measure an angular velocity vector(s) (also known as angle rate vector) (@) between ownship Node O 102-O and Node A 102-A, wherein such determination or measurement may be accomplished by direct measurement of the angle rate vector, or by successive measurements of the line-of-sight (LOS) angles between the Node O 102-O and Node A 102-A. In some embodiments, successive measurements of the angular velocity vectors may provide better estimates of a current angle rate when the time duration between measurements is made smaller.

The Node O 102-O may be configured to determine and/or measure relative velocity between ownship Node O 102-O and Node A 102-A. A relative position solution solely based upon angle rate measurements can be computed when there is relative motion that leads to angle rates between nodes 102. Node O 102-O may be configured to measure and/or determine the velocity vector of Node O 102-O (e.g., by using inertial navigation system (e.g., Ring Laser Gyro), Inertial Measurement Units (IMU), Fiber Optic Gyros (FOG), Micro-Electromechanical System (MEMS), etc.), or be stationary. For example, if Node O 102-O is in motion, Node A 102-A could be stationary or have velocity. For example, if Node O 102-O is stationary, Node A 102-A could have velocity. In some embodiments, Node O 102-O may be able to determine a better ownship position solution if a velocity vector of Node A 102-A is known to Node O 102-O or can be estimated at Node O 102-O.

The Node O 102-O may be configured to determine a relative range vector between the ownship Node O 102-O and Node A 102-A at least by using the above determined angle rate measurements and the above determined relative velocity vector. The angular velocity formula relationship of $$\vec{V} = \vec{\omega} \times \vec{R}$$

applies. By knowing any two of the three vectors of the formula, the third vector can be computed. Here, $\vec{\omega}$ (i.e., the rate of change of the LOS angle velocity vector between Node O 102-O and Node A 102-A) is measured, and $\vec{V}$ (the relative velocity vector between Node O 102-O and Node A 102-A) is determined using measured, known, and/or estimated values. By knowing $\vec{\omega}$ and $\vec{V}$, the relative range vector $\vec{R}$ between Nodes O 102-O and A 102-A can be computed, when $\vec{\omega}$ is non-zero.

If the absolute position (e.g., in WGS-84 coordinates) of Node O 102-O or Node A 102-A is known by Node O 102-O, the absolute position of the other node (either Node O or Node A) can be computed using the relative position between Node O 102-O and Node A 102-A, computed above.

In some embodiments, the Node O 102-O may be configured to use a position filter (e.g., Kalman filter, extended Kalman filter, least squares filter, an equivalent thereof, or the like) to optimize determining the estimated relative and/or absolute positions determined above based at least on appropriate weighting. The position solution may incorporate other node state information to aid the position determination processing into the position solution, such as by use of other position measurements, altitude measurements (e.g., from an altimeter), other sensor information (e.g., acceleration or other measurements of relative range), and/or other a-priori state measurements and/or estimates.

Figure 3A:
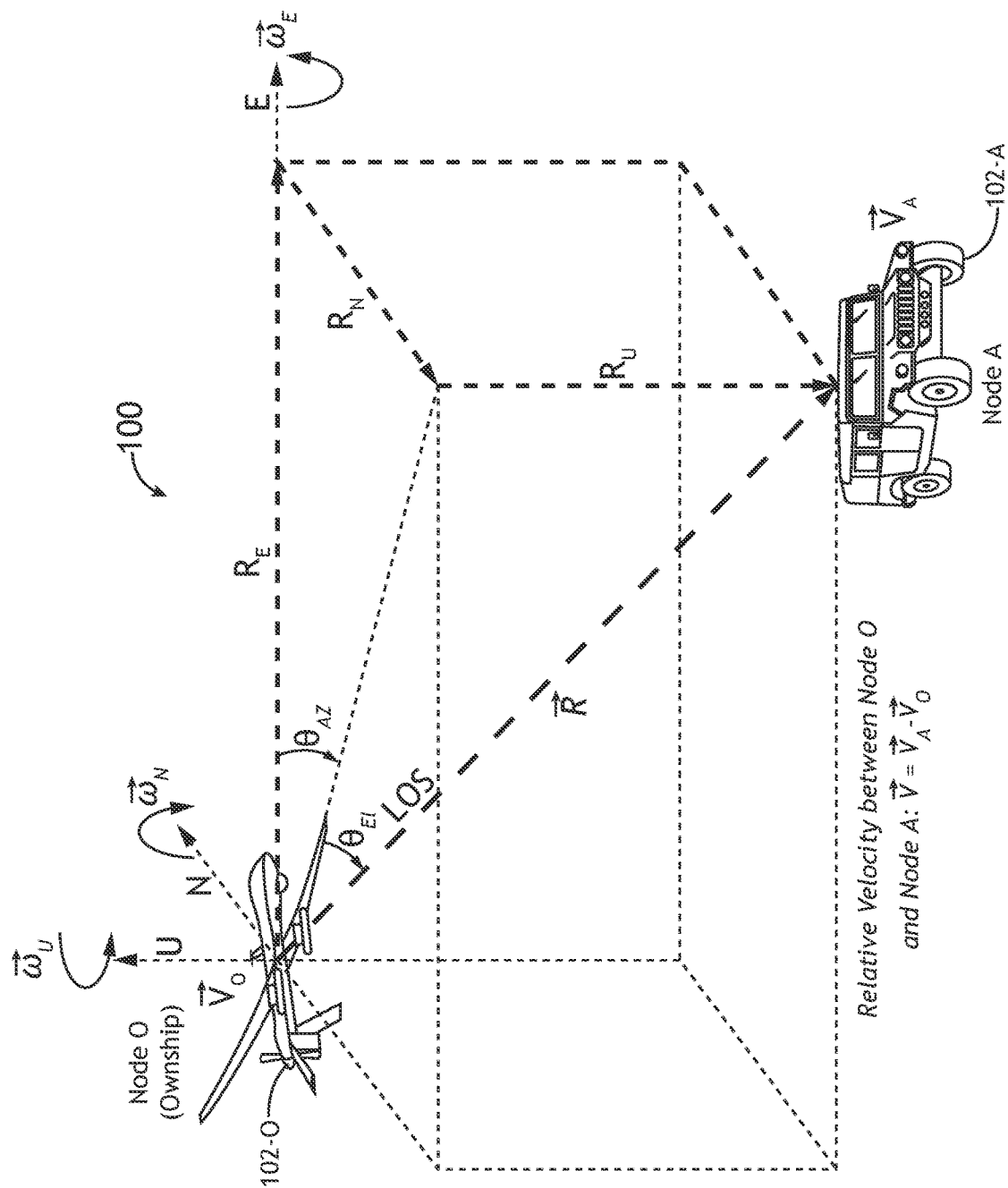
FIGS. 3A, 3B, 4A, and 4B are views of exemplary embodiments of the system of FIG. 1 according to the inventive concepts disclosed herein.
Figure 3B:
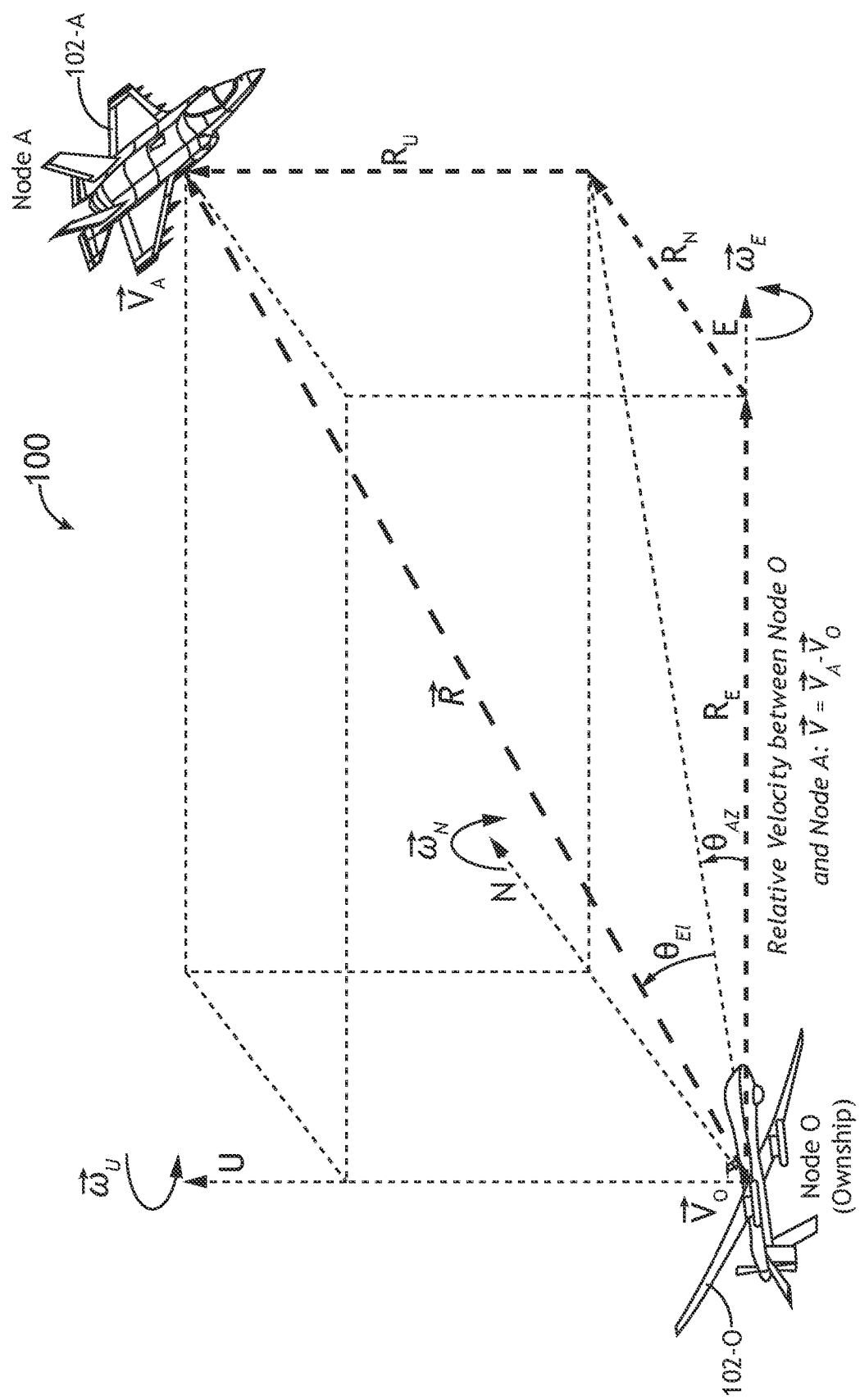

Referring now to FIGS. 3A and 3B, exemplary embodiments of the system 100 of FIG. 1, according to the inventive concepts disclosed herein, are depicted. As shown in FIGS. 3A and 3B, the system 100 may include Node O 102-O and Node A 102-A.

In some embodiments, the Node O 102-O may be configured to determine a three-dimensional own Node O position based at least on use of angular rate measurements ($\vec{\omega}$) of the rate of change of the LOS to the Node A 102-A.

In some embodiments, when there is relative velocity between two nodes (e.g., 102-O and 102-A) ($\vec{V}$) and not all of the relative velocity is along the LOS vector such that $\vec{\omega}$ is non-zero, the relative range vector ($\vec{R}$) between Node O and Node A can be determined for based at least on use of (a) the equation, $\vec{V} = \vec{\omega} \times \vec{R}$, (b) knowledge, measurements, and/or estimates of the rate of change of the angular velocity vector ($\vec{\omega}$) (e.g., which can be determined based upon one or more radio transmission from Node A, and/or measured by at least one EO/IR sensor, at least one radar, at least one LIDAR, and/or other sensor(s)), and/or (c) knowledge, measurements, and/or estimates of the velocities of Nodes O and 102-A.

As referenced in FIGS. 3A and 3B, the relative velocity V between two nodes (e.g., 102-O and 102-A) may be defined as:

$$\vec{V} = \vec{V}_A - \vec{V}_O = (V_{A\_E} - V_{O\_E})\vec{E} + (V_{A\_N} - V_{O\_N})\vec{N} + (V_{A\_U} - V_{O\_U})\vec{U},$$

where $\vec{V}_O$ is the velocity vector of Node O 102-O, where $\vec{V}_A$ is the velocity vector of Node A 102-A, where $\vec{V}_{O\_E}$ is the scalar value of the East component of $\vec{V}_O$, where $\vec{V}_{O\_N}$ is the scalar value of the North component of $\vec{V}_O$, where $\vec{V}_{O\_U}$ is the scalar value of the Up component of $\vec{V}_O$, where $V_{A\_E}$ is the scalar value of the East component of $\vec{V}_A$, where $V_{A\_N}$ is the scalar value of the North component of $\vec{V}_A$, and where $V_{A\_U}$ is the scalar value of the Up component of $\vec{V}_A$, and where vectors $\vec{E}$, $\vec{N}$, and $\vec{U}$ represent unit vectors in the direction of positive East, North, and Up axes, respectively.

As referenced in FIGS. 3A and 3B, the angular velocity vector $\vec{\omega}$ between two nodes (e.g., 102-O and 102-A) may be defined as:

$$\vec{\omega} = [\omega_E \vec{E}, \omega_N \vec{N}, \omega_U \vec{U}],$$

where $\omega_E$ is the scalar value of the East component of $\vec{\omega}$ (angular velocity rotation of the LOS range vector ($\vec{R}$) from Node O 102-O to Node A 102-A about the East axis), where $\omega_N$ is the scalar value of the North component of $\vec{\omega}$ (angular velocity rotation of the LOS range vector ($\vec{R}$) from Node O 102-O to Node A 102-A about the North axis), and where $\omega_U$ is the scalar value of the Up component of $\vec{\omega}$ (angular velocity rotation of the LOS range vector ($\vec{R}$) from Node O 102-O to Node A 102-A about the Up axis).

As referenced in FIGS. 3A and 3B, $\theta_{Az}$ is the azimuth angle referenced to the East axis of the LOS range vector ($\vec{R}$) that is projected to the East/North plane from Node O 102-O to Node A 102-A. The positive sense of the azimuth angle is toward the north axis. OEI is the elevation angle from the LOS range vector ($\vec{R}$) that is projected to the East/North plane from Node O 102-O to Node A 102-A to the LOS range vector ($\vec{R}$) from Node O 102-O to Node A 102-A. The positive sense of the elevation angle is positive upward. As shown in FIG. 3A, both $\theta_{Az}$ and $\theta_{EI}$ would have negative values, while in FIG. 3B both $\theta_{Az}$ and $\theta_{EI}$ would have positive values.

As referenced in FIGS. 3A and 3B, $R_E$ is the scalar value of the East component of the relative range vector ($\vec{R}$) from Node O 102-O to Node A 102-A, $R_N$ is the scalar value of the North component of the relative range vector ($\vec{R}$), and $R_U$ is the scalar value of the Up component of the relative range vector ($\vec{R}$).

The cross product of $\vec{\omega} \times \vec{R}$ is computed using the determinant (| |) as follows:

$$\vec{\omega} \times \vec{R} = \begin{vmatrix} \vec{E} & \vec{N} & \vec{U} \\ \omega_E & \omega_N & \omega_U \\ R_E & R_N & R_U \end{vmatrix} =$$

$$(\omega_N R_U - \omega_U R_N)\vec{E} - (\omega_E R_U - \omega_U R_E)\vec{N} + (\omega_E R_N - \omega_N R_E)\vec{U}$$

With $\vec{V}$ and $\vec{\omega}$ known, there are three equations as given below and three unknowns (i.e., the three components of the range vector, $R_E$, $R_N$, $R_U$), which is a solvable problem. The solution for the $\vec{R}$ is obtained based on the following equations:

$$V_E = (\omega_N R_U - \omega_U R_N),$$

(hereinafter referred to as "Equation 1");

$$V_N = -(\omega_E R_U - \omega_U R_E),$$

(hereinafter referred to as "Equation 2"); and $$V_U = (\omega_E R_N - \omega_N R_E),$$

(hereinafter referred to as "Equation 3").

For example, as shown in FIG. 3A, Node O 102-O (e.g., depicted as a UAV) may be in three-dimensional, airborne motion while Node A 102-A (e.g., depicted as an automobile) may be stationary or in motion on the ground. For example, as shown in FIG. 3B, Node O 102-O (e.g., depicted as a UAV) may be in three-dimensional, airborne motion while Node A 102-A (e.g., depicted as an aircraft) may be in three-dimensional, airborne motion.

Figure 4A:
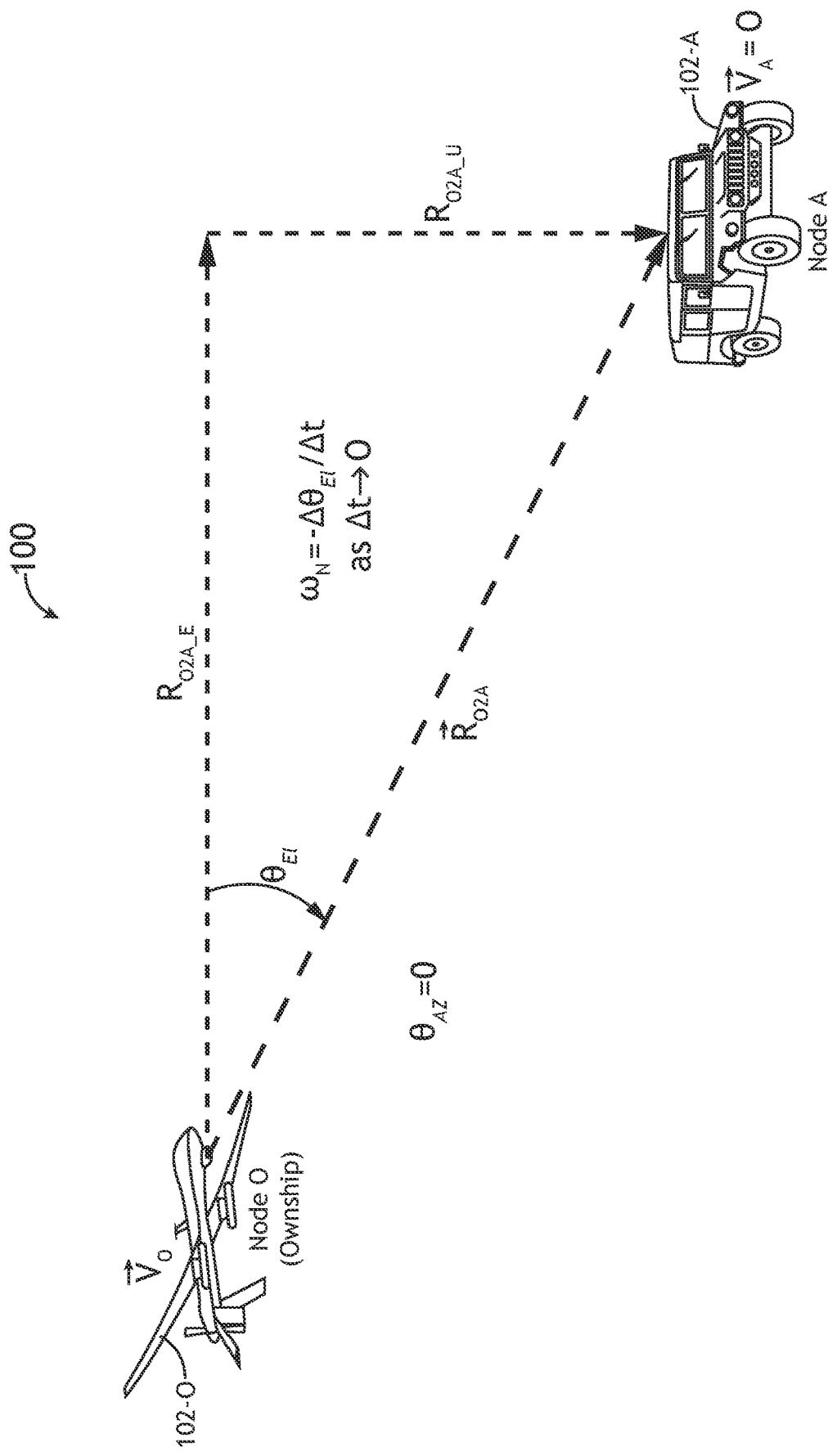
Figure 4B:
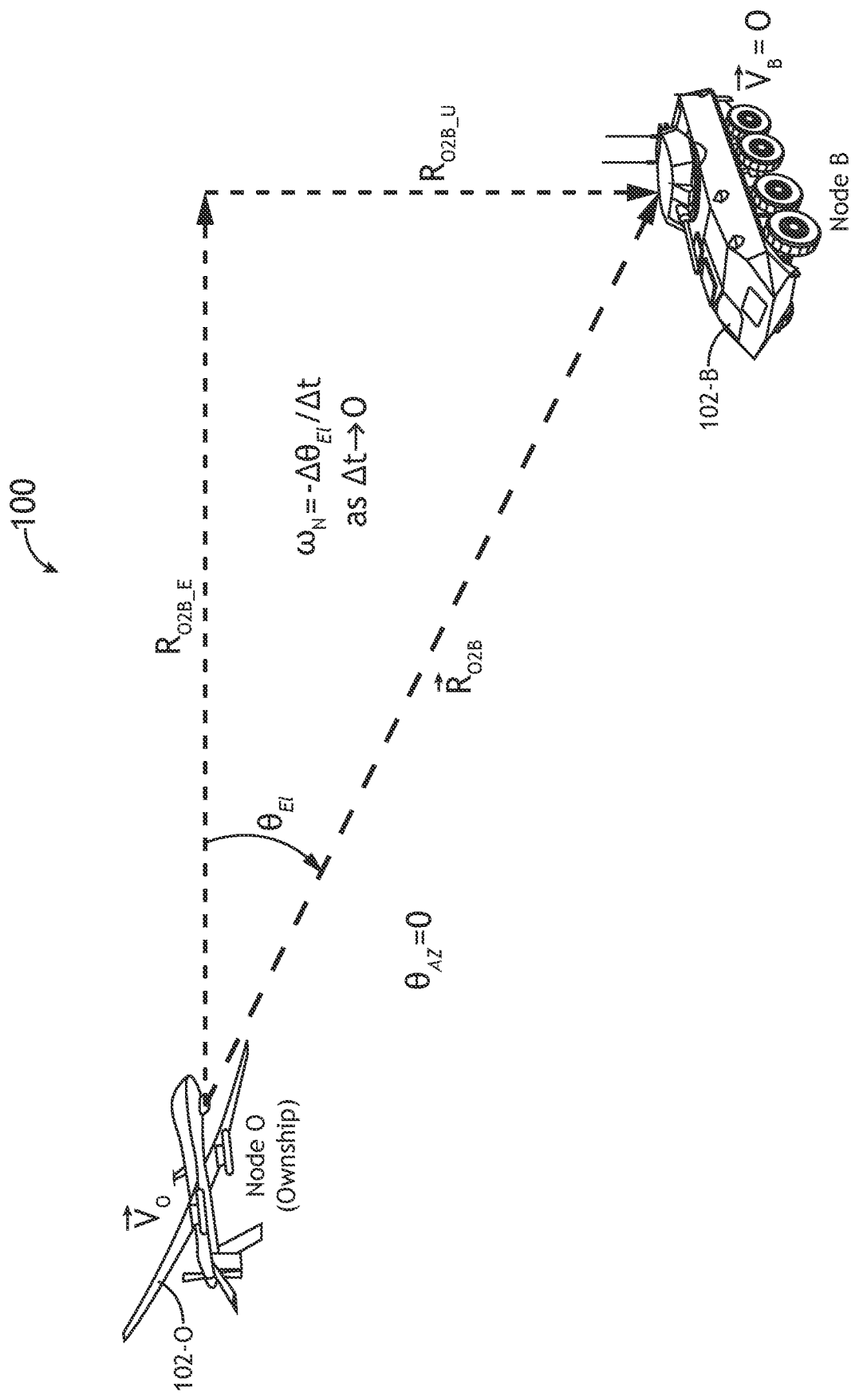

Referring now to FIGS. 4A and 4B, exemplary embodiments of the system 100 of FIG. 1, according to the inventive concepts disclosed herein, are depicted. As shown in FIGS. 4A and 4B, the system 100 may include Node O 102-O, Node A 102-A, and/or Node B 102-B. FIGS. 4A and 4B show exemplary two-dimensional diagrams for simplicity.

For an exemplary situation in reference to FIG. 4A, Node A 102-O is directly East of Node O 102-O, Node A 102-A has zero velocity, and Node O 102-O has a velocity in the Eastward direction only (i.e., zero velocity in the North and Down directions). Based on such exemplary situation, the Node O 102-O may be configured to determine the relative range vector ($\vec{R}_{O2A}$) between Node O 102-O and Node A 102-A, as described below.

The Node O 102-O may be configured to determine (e.g., measure) the rate of change of the LOS. In this case depicted in FIG. 4A, $\omega_E=0$ and $\omega_U=0$, while $\omega_N$, which is about the north axis since the azimuth angle is zero (i.e., $\theta_{Az}=0$), is represented the minus of the rate of change of the LOS elevation angle $\theta_{El}$ (i.e., $\omega_N = -\Delta\theta_{El}/\Delta t$, where t represents time, as $\Delta t \to 0$).

The Node O 102-O may be configured to determine the relative velocity vector between Node O 102-O and Node A 102-A. Because Node A 102-A, for the exemplary situation in reference to FIG. 4A, has zero velocity, the velocity of Node O 102-O with a negative sense is representative of the entire relative velocity between the nodes 102-O, 102-A. The velocity of Node O 102-O ($\vec{V}_O$) is equal to $\vec{V}_{O\_E} * E$, since the velocity in the north and down directions, in this example, have zero velocity.

The Node O 102-O may be configured to determine the range vector $\vec{R}_{O2A}$ (in meters or other suitable units) from Node O 102-O to Node A 102-A based on Equations 1 to 3. However, in the case of the exemplary situation in reference to FIG. 4A, the velocity of Node A is zero (i.e., $\vec{V}_A=0$, which means $V_{A\_E}=V_{A\_N}=V_{A\_U}=0$), the velocity (in meters/second or other suitable units) of ownship node in the North and Up directions are zero (i.e., $V_{O\_N}$ and $=V_{O\_U}=0$), and the LOS angle rates (in radians/second or other suitable units) about the East and Up axes are zero (i.e., $\omega_E=\omega_U=0$), and thus Equations 2 and 3 have all zero terms. In this degenerative case where there are no longer three independent equations (Equations 1, 2, and 3) from which to determine the relative range vector $\vec{R}_{O2A}$, the Up range vector can be determined using Equation 1, substituting in that $\omega_U=0$, results in the following equation:

$$V_E = (\omega_N R_U).$$

Solving this equation for $R_U$, yields:

$$R_U = (\omega_N / V_E).$$

For this example, $\omega_N$ is a positive scalar value and the relative velocity ($V_E$) is a negative scalar value, which results in the computation of $R_U$ being a negative scalar value indicating that Node A is below Node O.

Continuing the discussion of degenerative case, since Equations 2 and 3 are zero, Node O 102-O may be configured to determine the other components of the range vector between Node O 102-O and Node A 102-A using trigonometry rather than simply solving for the three unknown components of LOS Range vector ($\vec{R}$) from Equations 1, 2, and 3. If the LOS azimuth and elevation angular measurements (e.g., $\theta_{Az}$ and $\omega_{El}$, respectively) between Node O 102-O and Node A 102-A are accurate, Node O 102-O may be configured to determine the East and North relative ranges between Node O 102-O and Node A 102-A based at least on trigonometric equations. For the case depicted in FIG. 4A, the following trigonometric equations can be used to determine $\vec{R}_{O2A}$:

$$R_E = (R_U/\tan(\theta_{El})) * \cos(\theta_{Az}) = ((\omega_N/V_E)/\tan(\theta_{El})) * \cos(\theta_{Az}) = ((\omega_N/V_E)/\tan(\theta_{El})),$$

since for the example in FIG. 4A, $\theta_{Az}=0$ such that the $\cos(\theta_{Az})=1$;

$$R_N = (|R_U/\tan(\theta_{El})|) * \sin(\theta_{Az}) = 0,$$

since for the example in FIG. 4A, $\theta_{Az}=0$ such that the $\sin(\theta_{Az})=0$.

The symbol with the | | around scalar quantities is equivalent to absolute value; and for vector quantities, it is the magnitude of a vector. For this example, $\omega_N$ is a positive scalar value and the relative velocity ($V_E$) is a negative scalar value, $\theta_{El}$ is a negative scalar value (as drawn in FIG. 4A about −30 degrees and thus $\tan(\theta_{El})$ is also a negative value), which results in the computation of $R_U$ being a negative scalar value indicating that Node A is below Node O, $R_E$ being a positive scalar value indicating that Node A is East of Node O, and $R_N$ being zero since $\theta_{Az}$ and $\sin(\theta_{Az})$ are both zero. Thus, $$\vec{R}{O2A} = (R_E)\vec{E} + (R_N)\vec{N} + (R_U)\vec{U};$$

and substituting the results above for the example depicted in FIG. 4A yields:

$$\vec{R}{O2A} = ((\omega_N/V_E)/\tan(\theta_{El}))\vec{E} + (0)\vec{N} + (\omega_N/V_E)\vec{U}$$

For example, if the azimuth and elevation angular LOS measurements between Node O 102-O and Node A 102-A (e.g., $\theta_{Az}$ and/or $\theta_{El}$) are inaccurate (e.g., if there is a bias in the angle measured, but the angle rates are correct), the Node O 102-O may be configured to determine the relative ranges between Node O 102-O and Node A 102-A more accurately based preferably changing the LOS between Node O 102-O and Node A 102-A such that Equations 1, 2, and 3 are all non-zero such that there are three equations and three unknowns through movement of Node O 102-O or Node A 102-A. If that is not practical, Node O could compute the range to at least three or more Nodes (e.g., Nodes A, B, and C), or in some cases (e.g., if Nodes O, A, and B are known to node O to be in a common plane (e.g., EU plane, EN plane, or NU plane)) with only two other Nodes (Nodes A and B). For example, the Node O 102-O may be configured to repeat the above operations to determine the relative range with respect to two or more additional nodes 102 (e.g., Nodes B 102-B and C). For example, with respect to Node B 102-B, $R_{O2B}$ is $|\vec{R}_{O2B}|$, as shown in FIG. 4B. For example, with respect to Node C (not shown), $R_{O2C}$ is $|\vec{R}_{O2C}|$, as would be apparent from similar depictions of $R_{O2A}$ and $R_{O2B}$ with respect to FIGS. 4A and 4B.

The Node O 102-O may be configured to compute own Node O 102-O relative position and absolute position based at least on use of the relative range from multiple other nodes 102 (e.g., Node A 102-A, Node B 102-B, Node C, etc.) and the known positions of such multiple other nodes 102 (e.g., Node A 102-A, Node B 102-B, Node C, etc.).

Referring now to FIG. 5, an illustration related to exemplary embodiments of the system 100 of FIG. 1, according to the inventive concepts disclosed herein, is depicted. The node 102-O may be configured to determine ownship node position based at least on range magnitudes determined from two or more other nodes 102 (e.g., Node A, Node B, and/or Node C). For example, the node 102-O may be configured to determine ownship node position based at least on range magnitudes determined from three or more other nodes 102 (e.g., Node A, Node B, and Node C). For example, the node 102-O may be configured to determine and/or crosscheck ownship node position based at least on range magnitudes determined from two other nodes 102 (e.g., two of Node A, Node B, and Node C), in some situations, such as when Node O 102-O and the two other nodes 102 (e.g., two of Node A, Node B, and Node C) are known to be in a common plane (e.g., plane EU, plane EN, or plane UN).

As exemplarily shown in FIG. 5, the own Node O position can be determined at the intersection of the three or more node range spheres (e.g., 504-A, 504-B, 504-C) with radius of the computed ranges to Nodes A, B, and C (e.g., $|\vec{R}_{O2A}|$, $|\vec{R}_{O2B}|$, $|\vec{R}_{O2C}|$). In some cases (e.g., when it is known that Nodes O, A, and B are in a common plane), it may be possible to solve for own Node O position with two range spheres.

Computation of ranges from three other nodes 102 (e.g., Node A, Node B, and Node C) may enable the Node O 102-O to compute own Node O position at the intersection 502 of the three spheres formed from the ranges computed from the three other nodes (e.g., Node A, Node B, and Node C). This typically would involve two points of intersection 502 where the own Node O 102-O would be at one point of intersection 502. For example, this can be resolved (e.g., between the two points of intersection 502) based at least on a fourth node range measurement (e.g., between Node O 102-O and a Node D (not shown)), a reasonable a-priori estimate of own Node O position, and/or measurements between Node O 102-O and at least one of the other nodes 102 (e.g., Node A, Node B, and Node C) at another time.

Figure 6:
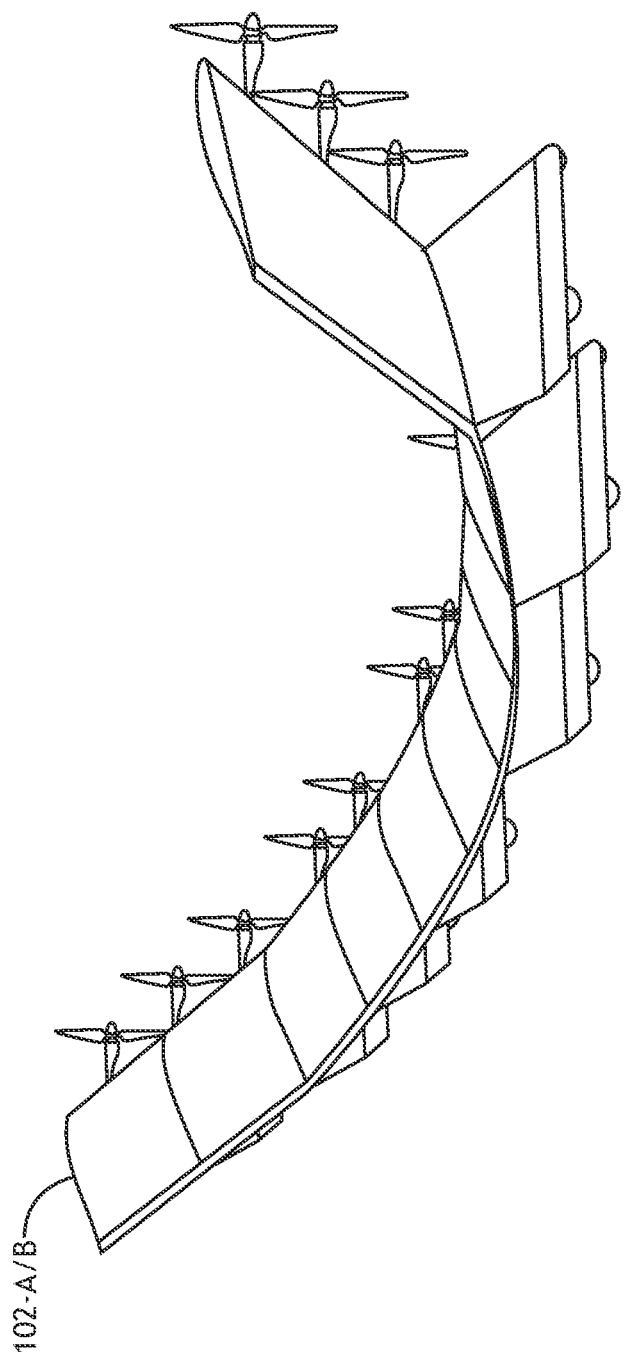
FIG. 6 is a view of an exemplary embodiment of the system of FIG. 1 according to the inventive concepts disclosed herein.

Referring now to FIG. 6, an exemplary embodiment of the system 100 of FIG. 1 including an exemplary node 102-A and/or 102-B according to the inventive concepts disclosed herein, is depicted.

Some embodiments may have civil (e.g., commercial) applications that allow for providing positioning, navigation, and time (PNT) services over a local area to meet specific mission needs (e.g., of an airport or mining operation, over a narrow region (e.g., over the Grand Canyon as a navigation aide in terrain challenged areas), over a wide region (e.g., state or multi-state), country wide (e.g., over the entire United States), or over larger areas to include the entire world and beyond (e.g., moon, solar system, deep space, etc.)).

For example, as shown in FIG. 6, one such application is to field multiple nodes 102 (e.g., 102-A, 102-B, Node C, and/or Node D) as High-Altitude Platform Systems (HAPS), which may loiter at high altitude above the earth (e.g., in the stratosphere at approximately 60,000 feet) for extended periods of time (e.g., months to years in duration), such that the HAPS nodes 102 (e.g., 102-A, 102-B, Node C, and/or Node D) actively perform TWTR between HAPS nodes 102 (e.g., 102-A, 102-B, Node C, and/or Node D) and/or between HAPS nodes 102 (e.g., 102-A, 102-B, Node C, and/or Node D) and other airborne or ground nodes. As part of their TWTR protocol, the HAPS nodes 102 (e.g., 102-A, 102-B, Node C, and/or Node D) may transmit their precise position, and the TWTR signals could be used for a wide range of military and/or civil PNT applications (e.g., as well as communications, surveillance, atmospheric sensing, environmental sensing, etc.).

For example, HAPS aircraft may be built for long duration and high-altitude flight. Such HAPS aircraft may be used for the active TWTR nodes to provide a large coverage footprint.

For example, the Node O 102-O may not transmit any RF signal during a time interval spanning performance of: the receipt of the at least one signal from the other node (e.g., the HAPS nodes 102 (e.g., 102-A, 102-B, Node C, and/or Node D)); the determination of the angular velocity vector between the node 102-O and the other node (e.g., the HAPS nodes 102 (e.g., 102-A, 102-B, Node C, and/or Node D)); the determination of the velocity vector of the node 102-O; the determination of the velocity vector of the other node (e.g., the HAPS nodes 102 (e.g., 102-A, 102-B, Node C, and/or Node D)); the determination of the relative velocity vector between the node 102-O and the other node (e.g., the HAPS nodes 102 (e.g., 102-A, 102-B, Node C, and/or Node D)); and the determination of the range vector between the node 102-O and the other node (e.g., the HAPS nodes 102 (e.g., 102-A, 102-B, Node C, and/or Node D)).

For example, the node 102-O may not transmit any two-way timing and ranging (TWTR) interrogation message or TWTR response message during a time interval spanning performance of: the receipt of the at least one signal from the other node (e.g., the HAPS nodes 102 (e.g., 102-A, 102-B, Node C, and/or Node D)); the determination of the angular velocity vector between the node 102-O and the other node (e.g., the HAPS nodes 102 (e.g., 102-A, 102-B, Node C, and/or Node D)); the determination of the velocity vector of the node 102-O; the determination of the velocity vector of the other node (e.g., the HAPS nodes 102 (e.g., 102-A, 102-B, Node C, and/or Node D)); the determination of the relative velocity vector between the node 102-O and the other node (e.g., the HAPS nodes 102 (e.g., 102-A, 102-B, Node C, and/or Node D)); and the determination of the relative range vector between the node 102-O and the other node (e.g., the HAPS nodes 102 (e.g., 102-A, 102-B, Node C, and/or Node D)); and, optionally, a determination of the absolute position of the node 102-O.

Figure 7:
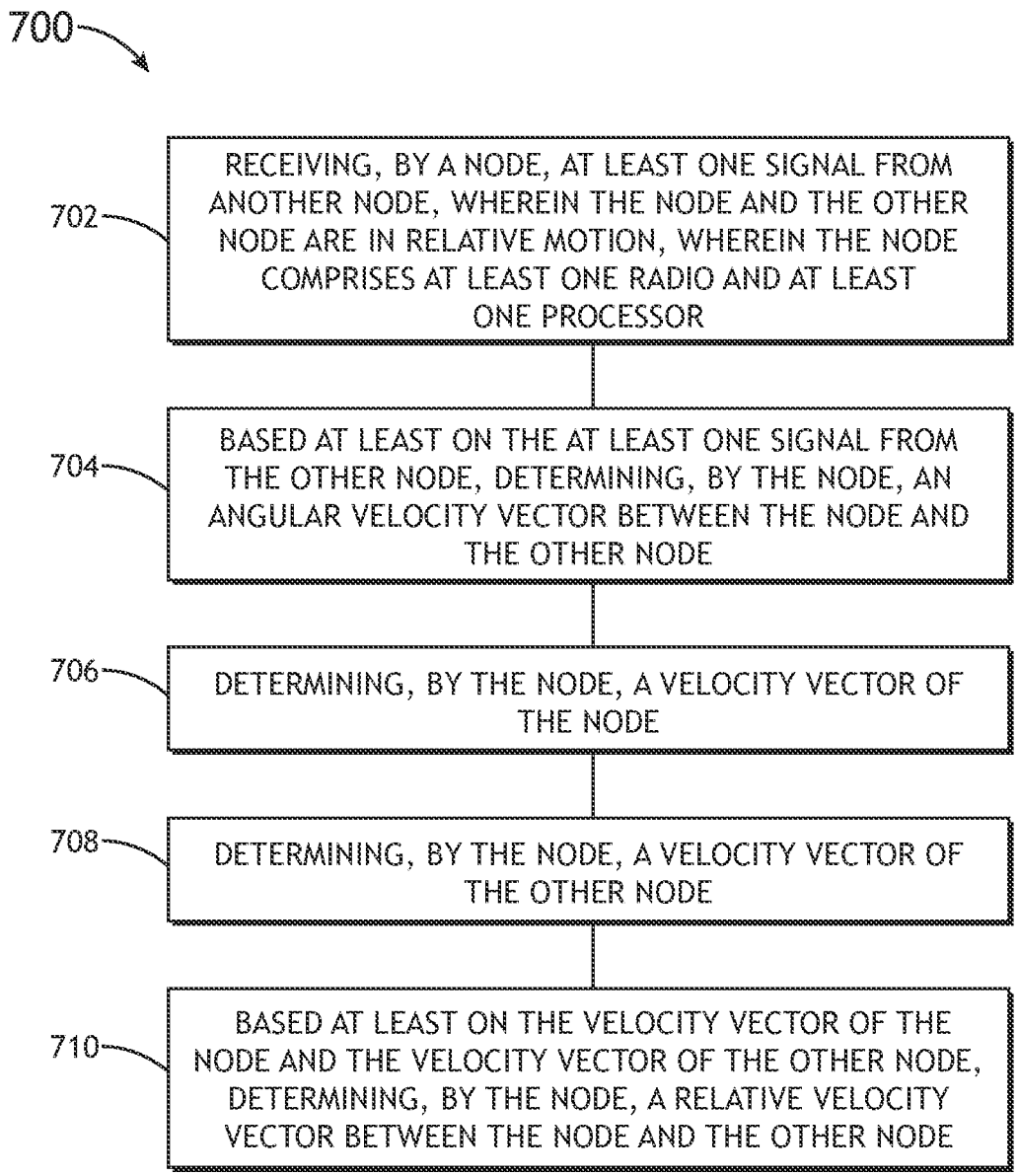
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include receiving, by a node, at least one signal from another node, wherein the node and the other node are in relative motion, wherein the node comprises at least one radio and at least one processor.

A step 704 may include based at least on the at least one signal from the other node, determining, by the node, an angular velocity vector between the node and the other node.

A step 706 may include determining, by the node, a velocity vector of the node.

A step 708 may include determining, by the node, a velocity vector of the other node.

A step 710 may include based at least on the velocity vector of the node and the velocity vector of the other node, determining, by the node, a relative velocity vector between the node and the other node.

A step 712 may include based at least on the angular velocity vector and the relative velocity vector between the node and the other node, determining, by the node, a relative range vector between the node and the other node, the relative range vector indicating a relative position between the node and the other node.

A step 714 may include based at least on the relative range vector, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

Further, the method 700 may include any of the operations disclosed throughout.

As will be appreciated from the above, embodiments of the inventive concepts disclosed herein may be directed to method and a system including a node configured to determine a relative range vector between the node and another node (e.g., based at least on an angular velocity vector and a relative velocity vector between the node and the other node).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
 a node comprising at least one radio and at least one processor, the node configured to:
  receive at least one signal from another node, wherein the node and the other node are in relative motion;
  based at least on the at least one signal from the other node, determine an angular velocity vector between the node and the other node;

determine a velocity vector of the node;
determine a velocity vector of the other node;
based at least on the velocity vector of the node and the velocity vector of the other node, determine a relative velocity vector between the node and the other node;
based at least on the angular velocity vector and the relative velocity vector between the node and the other node, determine a relative range vector between the node and the other node, the relative range vector indicating a relative position between the node and the other node; and
based at least on the relative range vector, at least one of (a) output instructions to adjust communication parameters, (b) output instructions to adjust operational parameters of at least one of at least one sub-system or at least one sensor of the node, (c) output instructions to display at least one graphical image including information of the at least one of the position information of the node or the time information of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

2. The system of claim 1, wherein the node does not transmit any radiofrequency signal during a time interval spanning performance of: the receipt of the at least one signal from the other node; the determination of the angular velocity vector between the node and the other node; the determination of the velocity vector of the node; the determination of the velocity vector of the other node; the determination of the relative velocity vector between the node and the other node; and the determination of the range vector between the node and the other node.

3. The system of claim 1, wherein the node does not transmit any two-way timing and ranging (TWTR) interrogation message or TWTR response message during a time interval spanning performance of: the receipt of the at least one signal from the other node; the determination of the angular velocity vector between the node and the other node; the determination of the velocity vector of the node; the determination of the velocity vector of the other node; the determination of the relative velocity vector between the node and the other node; and the determination of the range vector between the node and the other node.

4. The system of claim 1, wherein the node is further configured to:
based at least on the range vector and one of (a) an absolute position of the node or (b) an absolute position of the other node, determine an absolute position of another of the node or the other node.

5. The system of claim 1, wherein the at least one signal are multiple signals, wherein the node is further configured to:
based at least on the multiple signals from the other node, determine multiple angular velocity vectors to determine the angular velocity vector between the node and the other node, wherein the angular velocity vector is a weighted angular velocity vector; and
based at least on the weighted angular velocity vector and the relative velocity vector between the node and the other node, determine the relative range vector between the node and the other node.

6. The system of claim 5, wherein the weighted angular velocity vector is average weighted or recency weighted.

7. The system of claim 1, wherein the node is further configured to:
receive at least one signal from an additional node, wherein the node and the additional node are in relative motion;
based at least on the at least one signal from the additional node, determine an additional angular velocity vector between the node and the additional node;
determine an additional velocity vector of the node;
determine an additional velocity vector of the additional node;
based at least on the additional velocity vector of the node and the additional velocity vector of the additional node, determine an additional relative velocity vector between the node and the additional node;
based at least on the additional angular velocity vector and the additional relative velocity vector between the node and the additional node, determine an additional relative range vector between the node and the additional node, the additional relative range vector indicating a relative position between the node and the additional node; and
based at least on the additional relative range vector, at least one of (a) output additional instructions to adjust the communication parameters, (b) output additional instructions to adjust the operational parameters of at least one of the at least one sub-system or the at least one sensor of the node, (c) output additional instructions to display the at least one graphical image including information of the at least one of the position information of the node or the time information of the node, (d) output additional instructions to navigate the node, (e) output additional instructions to communicate with the at least one node, (f) authenticate the position information obtained from the at least one navigation system, (g) authenticate the time information obtained from the at least one time system, or (h) output additional instructions to the at least one node to support controlling the communications with the node through the at least one node.

8. The system of claim 1, wherein the node knows the absolute position of one of the node or the other node, wherein the node is further configured to determine the absolute position of the other of the node or the other node based at least on the absolute position of the one of the node or the other node and the relative range vector.

9. The system of claim 1, wherein the at least one signal are multiple signals, wherein the node is further configured to iteratively:
receive each of the multiple signals from the other node, wherein the node and the other node are in relative motion;
based at least on at least some of the multiple signals from the other node, determine the angular velocity vector between the node and the other node;
determine the velocity vector of the node;
determine the velocity vector of the other node;
based at least on the velocity vector of the node and the velocity vector of the other node, determine the relative velocity vector between the node and the other node; and based at least on the angular velocity vector and the relative velocity vector between the node and the other node, determine the relative range vector between the node and the other node.

10. The system of claim 9, wherein the node is further configured to iteratively:
use a position filter to optimize the relative range vector between the node and the other node.

11. The system of claim 10, wherein the position filter comprises at least one of a Kalman filter, an extended Kalman filter, or a least squares filter.

12. The system of claim 1, wherein the at least one signal is at least one radiofrequency signal.

13. The system of claim 1, wherein the node further comprises at least one sensor.

14. The system of claim 13, wherein the at least one sensor comprises at least one of at least one electro-optical/infrared (EO/IR) sensor, at least one radar sensor, or at least one LIDAR sensor.

15. The system of claim 13, wherein the node further comprises at least one navigation system.

16. The system of claim 15, wherein the at least one navigation system comprises at least one inertial navigation system.

17. The system of claim 16, wherein the least one inertial navigation system comprises at least one of at least one Ring Laser Gyro, at least one Inertial Measurement Unit (IMU), at least one Fiber Optic Gyro (FOG), or at least one Micro-Electromechanical System (MEMS).

18. The system of claim 15, wherein the node further comprises at least one antenna.

19. The system of claim 18, wherein the node is further configured to:
based at least on the at least one signal from the other node and information received from at least one of the at least one radio or the at least one sensor, determine the angular velocity vector between the node and the other node;
determine the velocity vector of the node based at least on information received from the at least one navigation system; and
determine the velocity vector of the other node based at least on information received from the at least one sensor.

20. A method, comprising:
receiving, by a node, at least one signal from another node, wherein the node and the other node are in relative motion, wherein the node comprises at least one radio and at least one processor;
based at least on the at least one signal from the other node, determining, by the node, an angular velocity vector between the node and the other node;
determining, by the node, a velocity vector of the node;
determining, by the node, a velocity vector of the other node;
based at least on the velocity vector of the node and the velocity vector of the other node, determining, by the node, a relative velocity vector between the node and the other node;
based at least on the angular velocity vector and the relative velocity vector between the node and the other node, determining, by the node, a relative range vector between the node and the other node, the relative range vector indicating a relative position between the node and the other node; and
based at least on the relative range vector, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

* * * * *